(12) United States Patent
Schlegelmann et al.

(10) Patent No.: US 7,115,037 B2
(45) Date of Patent: Oct. 3, 2006

(54) UNIVERSAL JOINT AND METHOD OF SERVICING A STAKED UNIVERSAL JOINT

(75) Inventors: Joseph Schlegelmann, Marlette, MI (US); Benjamin Schleis, Westland, MI (US); Eric M. Fischer, Saline, MI (US); Anil K. Ippalapelli, Canton, MI (US); Duane A. Lewis, Westland, MI (US); Michael Moray Start, Shelby Township, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 35 days.

(21) Appl. No.: 10/696,791

(22) Filed: Oct. 30, 2003

(65) Prior Publication Data

US 2005/0096140 A1    May 5, 2005

(51) Int. Cl.
    *F16D 3/40*    (2006.01)
(52) U.S. Cl. .................................... 464/130; 464/134
(58) Field of Classification Search ............... 464/127, 464/128, 130, 134; 384/585; 29/402.6
    See application file for complete search history.

(56) References Cited

U.S. PATENT DOCUMENTS

| | | | |
|---|---|---|---|
| 1,993,357 A * | 3/1935 | Braun et al. ............... | 464/130 |
| 3,005,324 A | 10/1961 | Zeller | |
| 3,008,226 A | 11/1961 | Kellerman | |
| 3,324,681 A | 6/1967 | Burns et al. | |
| 3,721,110 A | 3/1973 | Borneman | |
| 3,786,544 A | 1/1974 | Ferguson | |
| 3,788,712 A | 1/1974 | Kohler et al. | |
| 3,881,324 A * | 5/1975 | Girquis ................... | 464/130 X |
| 4,482,337 A * | 11/1984 | Petrzelka ................. | 464/128 |
| 4,638,541 A | 1/1987 | Schindler, Jr. | |
| 4,704,782 A | 11/1987 | Spiess et al. | |
| 4,708,541 A | 11/1987 | Edgerton | |
| 4,861,314 A | 8/1989 | Mazziotti | |
| 4,943,262 A | 7/1990 | Schultze | |
| 4,977,660 A | 12/1990 | Maynard | |
| 5,417,613 A | 5/1995 | Aiken | |
| 5,715,600 A | 2/1998 | Marriott et al. | |
| 5,797,800 A | 8/1998 | Rhoades et al. | |
| 5,857,252 A | 1/1999 | Jansen | |
| 6,035,533 A | 3/2000 | Warnke et al. | |
| 6,162,126 A | 12/2000 | Barrett et al. | |
| 6,192,567 B1 | 2/2001 | Newville | |

(Continued)

FOREIGN PATENT DOCUMENTS

JP    60-95221    *    5/1985

OTHER PUBLICATIONS

Copy of pending application (13 pages) and drawings (5 pages) for U.S. Appl. No. 10/028,241, filed Dec. 20, 2001, entitled "Method And Apparatus For Servicing A Staked Universal Joint," to Schlegelmann et al.

(Continued)

*Primary Examiner*—Greg Binda

(57) ABSTRACT

Universal joints, and more particularly, an apparatus and method for servicing staked universal joints as well as a u-joint serviced with the method and the apparatus. The service kit includes a replacement bearing assembly, a retention assembly and a spacer sized to fit between the retention assembly and the replacement bearing assembly. The method generally includes the steps of removing the stakes from an aperture on a driveshaft, removing an original bearing assembly from the aperture, inserting the replacement bearing assembly into the aperture, inserting the spacer into the aperture and retaining the spacer and replacement bearing assembly within the aperture with the retention assembly.

6 Claims, 8 Drawing Sheets

U.S. PATENT DOCUMENTS

| | | |
|---|---|---|
| 6,257,986 B1 | 7/2001 | Duggan et al. |
| 6,280,335 B1 | 8/2001 | Wehner et al. |
| 6,454,656 B1 | 9/2002 | Brissette et al. |
| 6,484,403 B1 | 11/2002 | Macklin et al. |
| 2003/0224862 A1* | 12/2003 | Schultze .................... 464/127 |

OTHER PUBLICATIONS

Drawing dated Nov. 28, 2001 illustrating a U-joint offered for sale by Applicant more than one year prior to the filing of the application and including a yoke with an inner surface defining an aperture and an annular groove (1 page).

* cited by examiner

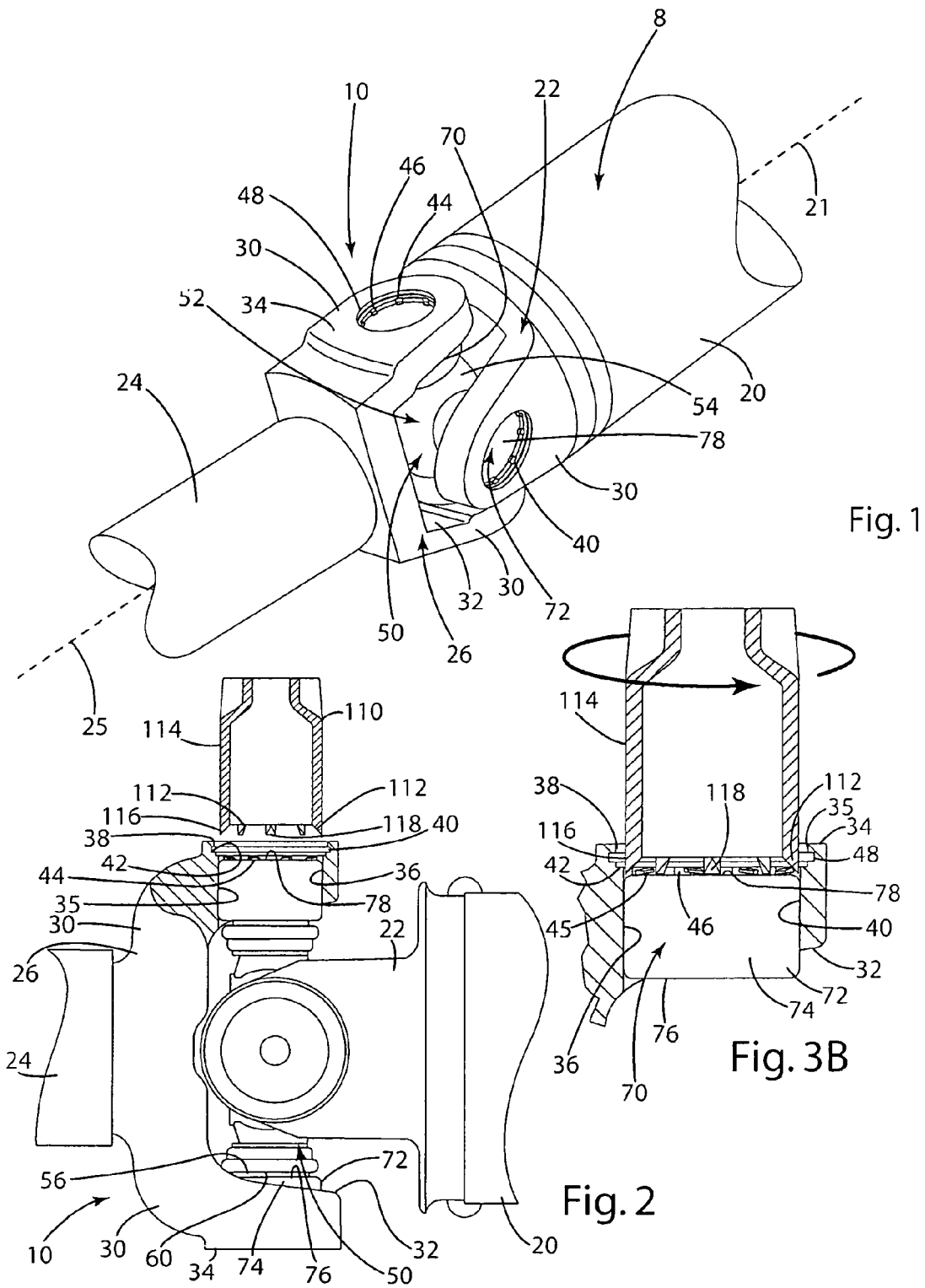

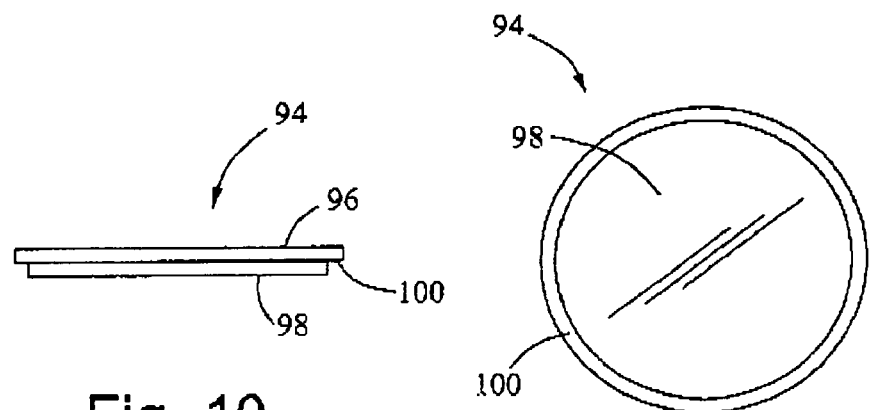
Fig. 10
Fig. 11
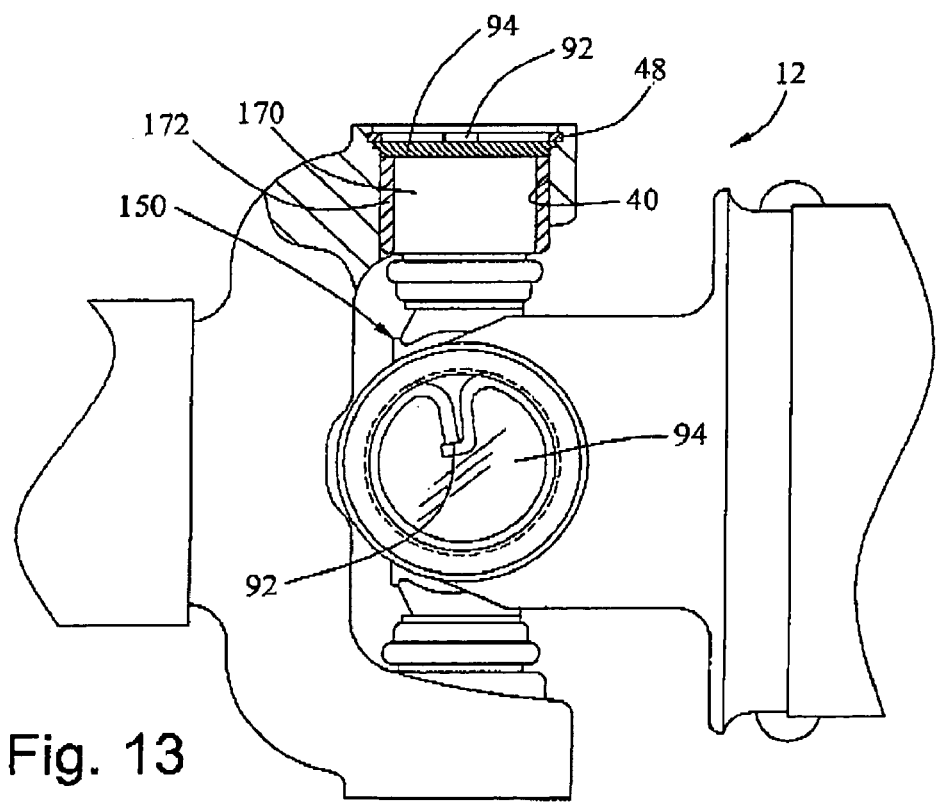
Fig. 13

UNIVERSAL JOINT AND METHOD OF SERVICING A STAKED UNIVERSAL JOINT

BACKGROUND OF THE INVENTION

The present invention relates to universal joints, and more particularly, to an apparatus and method for servicing staked universal joints.

Universal joints are widely used in motor vehicle drivetrains for interconnecting a pair of rotating shafts to permit movement and flex within the drivetrain. Universal joints commonly include a pair of bifurcated yokes secured to the shafts and interconnected with a cruciform. The cruciform includes four orthogonal trunnions arranged in opposed pairs with each pair mounted in a pair of aligned apertures formed in one of the bifurcated yokes. A bearing assembly is secured in each aperture and around each trunnion to minimize friction as the yokes pivot.

Snap rings and staking are the two most common retention methods used to couple bearing cups to the yokes and simultaneously center and align the axes of the shafts. For proper balanced operation of the driveshaft, the rotary axis of the rotating shafts and yokes must be aligned. The rotary axes are typically aligned by centering the cruciform between the yokes and properly positioning the bearing cups in the apertures. Staking and similar permanent yoke deformation operations use expensive machinery to center the bearing cups, crossmembers, and yokes, and then deform the yokes to secure the bearing cups in a balanced position. While staking provides a well balanced drive shaft, special tools are required for aligning the axes and deforming the yokes when servicing a staked U-joint. Therefore, the number of repair shops capable of servicing the staked U-joints is limited. Further, it is difficult to securely stake a bearing cup in a yoke that has been previously staked due to the already deformed yokes and therefore, most staked universal joint driveshafts are not serviced but are replaced.

Snap rings are commonly used to secure the bearing cups within the yokes in place of staking and allow for ease of serviceability. Snap rings generally do not align the axes of the shafts or center the U-joint as accurately as staked U-joints, but allow for easy serviceability. Snap rings typically fit within an annular groove in the apertures in the yoke so that the centerline symmetry is fixed when the yokes are machined. To increase the longevity of universal joints as well as reduce noise, vibration, and other harshness issues, manufacturers have increasingly been using the more precisely centered staked U-joints. Therefore, a method and apparatus for servicing staked U-joints is needed.

SUMMARY OF THE INVENTION

The present invention relates to universal joints, and more particularly, to an apparatus and method for servicing staked universal joints as well as a u-joint serviced with the method and apparatus of the present invention.

The serviced universal joint includes a yoke having a leg with an inboard surface and an outboard surface and an aperture extending between the inboard and outboard surfaces. The aperture is defined by an inner surface including an annular groove and a bearing cup positioned in the aperture. A retention member is disposed within the annular groove and a spacer is disposed between the bearing cup and the retention member.

The method for servicing a staked universal joint with a replacement bearing assembly, a spacer and a retention member, wherein the universal joint has a yoke defining an aperture and a plurality of stakes within the aperture for retaining an original bearing assembly and wherein the aperture includes an annular groove, includes the steps of: removing the stakes; removing the original bearing cup from the aperture after removing the stakes; inserting the replacement bearing cup into the aperture after removing the original bearing cup; inserting the spacer into the aperture; and coupling the retention member to the annular groove after inserting the spacer, the spacer being disposed between the replacement bearing cup and the retention member.

The service kit for servicing a staked universal joint includes, a retention member sized to fit within an annular groove, and a spacer sized to fit between the retention member and a replacement bearing assembly. A cutting tool may also be included in the service kit.

The method for servicing a staked universal joint may also include the steps of, providing a service kit having, a cutting tool for cutting the stakes, a replacement bearing assembly, and a retention assembly having a retention member sized to fit within the annular groove and a spacer sized to fit within the aperture between the retention member and the replacement bearing assembly.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 is a perspective view of a staked U-joint;

FIG. 2 is a side elevation view of the staked U-joint, partially in section, showing an aligned cutting tool;

FIG. 3B is a partial sectional view showing the cutting tool inserted into the aperture and cutting the stakes;

FIG. 10 is an elevation view of the spacer;

FIG. 11 is a bottom plan view of the spacer;

FIG. 13 is a partial sectional view of the serviced U-joint.

DETAILED DESCRIPTION OF THE PREFERRED EMBODIMENT

Figure 8:
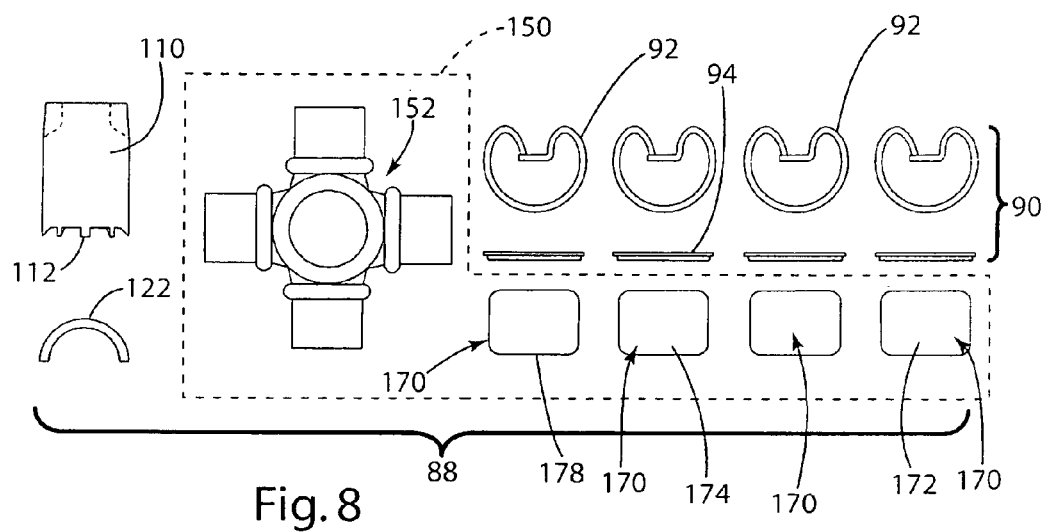
FIG. 8 is a top plan view of an exemplary service kit.
Figure 9:
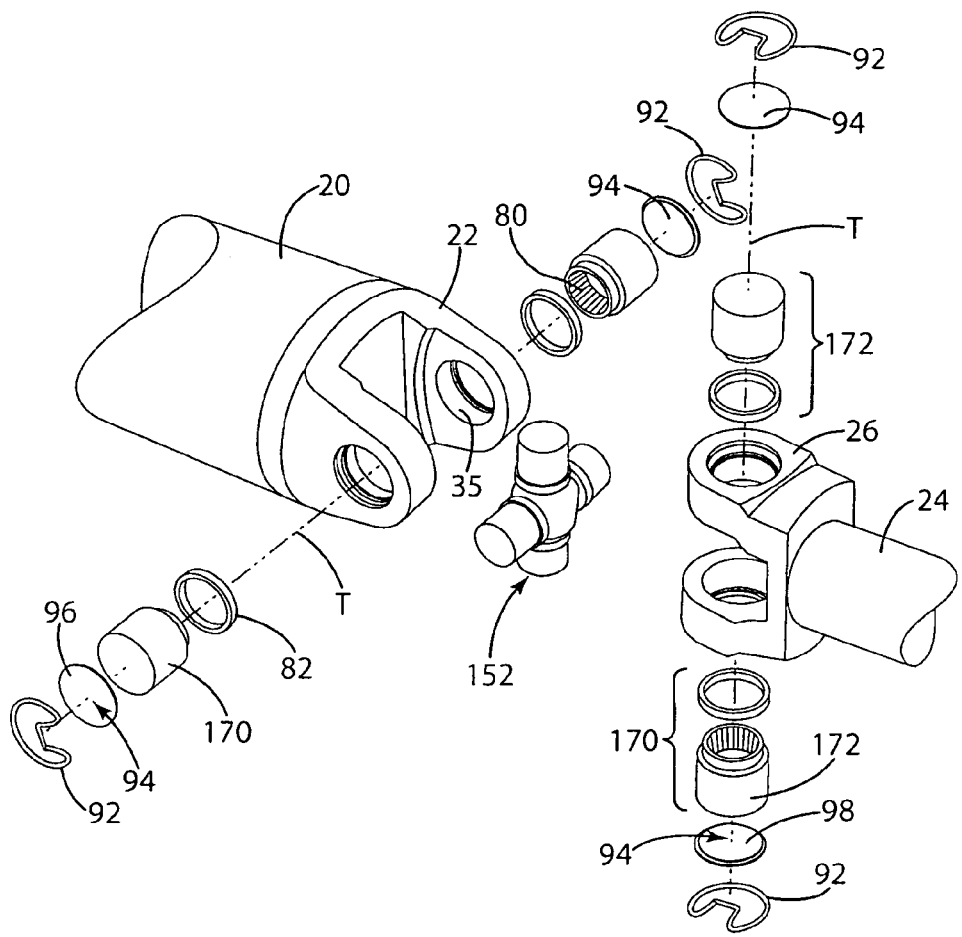
FIG. 9 is an exploded perspective view of a serviced U-joint.
Figure 12:
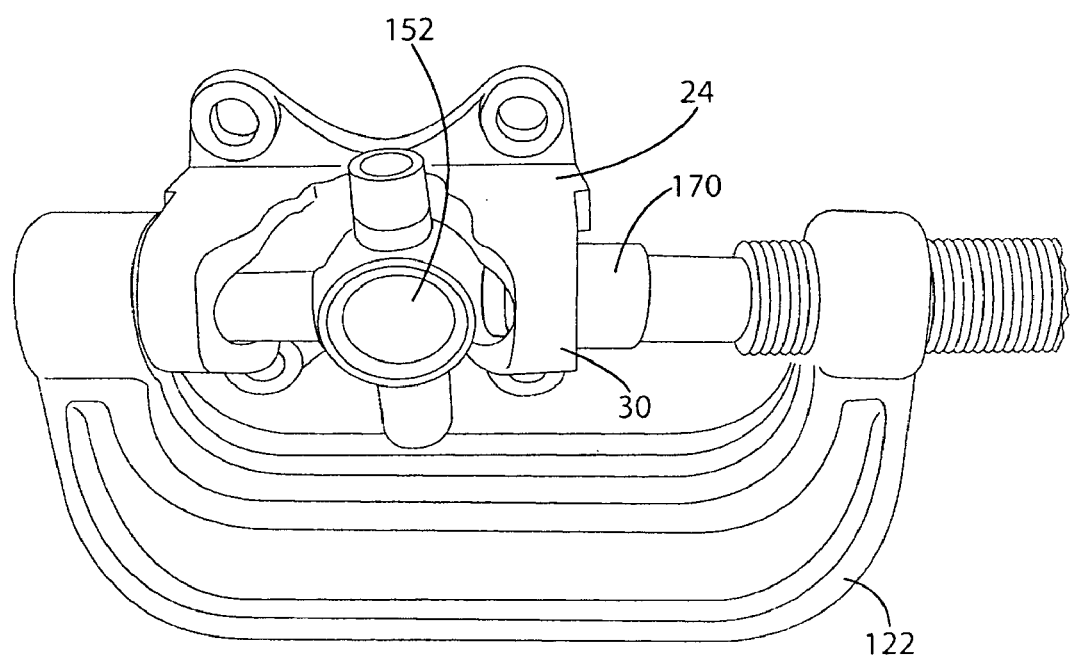
FIG. 12 is a perspective view of a bearing cup being pressed into an aperture.

The present invention is directed to a staked universal joint and a method of servicing a staked universal joint 10 (FIGS. 1 and 2). The staked universal joint 10 is serviced by removing the spider assembly 50 (FIGS. 3A–7) and replacing it with a replacement spider assembly 150 (FIGS. 9, 12, and 13). A service kit 88 (FIG. 8) generally includes the replacement spider assembly 150.

The staked universal joint 10 (FIGS. 1 and 2), as assembled before servicing, will now be described in greater detail. FIG. 1 illustrates a staked universal joint 10 having a first shaft 20 with a first yoke 22 connected by a spider assembly 50 to a second yoke 26 and a second shaft 24. The first and second yokes 22, 26 are fixed to rotate with the first shaft 20 and the second shaft 24, respectively. The first shaft 20 includes a first shaft axis 21 and the second shaft 24 includes a second shaft axis 25 angled relative to the first shaft axis. The yokes 22, 26 include bifurcated laterally spaced legs 30 which are preferably symmetric relative to the rotary axis 21, 25 of the respective shaft 20, 24. The bifurcated legs 30 each have an inboard surface 32 and an outboard surface 34, with an aperture 40 extending therebetween. The inboard surface 32 of the legs 30 faces the rotary axis 21, 25 of the respective shaft 20, 24 and the outboard surface 34 faces away from the rotary axis 21, 25.

The aperture 40 generally retains a bearing assembly 70 from the spider assembly 50 between the outboard and inboard surfaces 32, 34. As illustrated in FIG. 2, an inner surface 35 defines the aperture 40 and further defines an annular groove 48 having a first diameter 31, shown in FIGS. 3A and 3B, to receive a retention member 92 such as a snap ring during servicing, and a second diameter 37 located inboard of annular groove 48. Stakes 44 engaging the spider assembly 50, specifically the bearing assembly 70, are also formed within the aperture 40. The annular groove 48 is located between the stakes 44 and the outboard surface 34. The stakes 44 are formed as is well known in the art by deforming a portion of the inner surface 35. In the illustrated embodiment, the inner surface 35 is counterbored and includes an inboard radial wall 36 having a third diameter 41 that is smaller than the second diameter 37, and an outboard radial wall 38 with an annular seat 42 therebetween. Stakes 44 are mutually spaced angularly and aligned axially in a circular ring, which, upon removal of the stakes, provides an annular space 39 located at the outboard end of radial wall 36. Stakes 44 are formed by deforming the annular seat 42 of the inner surface 35 so that the stakes engage the bearing assembly 70. Generally, stake grooves 46 are located on the annular seat 42 as well the inboard radial wall 36. The outboard radial wall 38 defines the annular groove 48.

The spider assembly 50, secured between the yokes 22, 26, allows the yokes to freely pivot as the driveshaft rotates. The spider assembly 50 includes a cruciform 52 having four orthogonal trunnions 60 arranged in opposing pairs with bearing assemblies 70 located on each trunnion. The cruciform 52 may be formed in a variety of sizes and shapes, but generally includes crossmember 54 from which the four trunnions 60 extend in a single plane at right angles to each other. The trunnions 60 are cylindrical and adapted to be inserted into the apertures 40 so that a first set of opposing trunnions are secured to the first shaft 20 while the other set of opposing trunnions are secured to the second shaft 24. The trunnions 60 include a radial bearing surface 64 and an end surface 62. The trunnions 60 are machined smooth and each typically includes a trunnion lip 56. The apertures 40 are aligned on the trunnion axis T (FIG. 9), approximately perpendicular to the rotary axes 21, 25 of the respective shafts 20, 24.

The bearing assemblies 70 are well known in the art and include a bearing cup 72, roller bearings 80, and a seal 82. The roller bearings 80 minimize friction between the trunnions 60 and the bearing cups 72 secured to the yokes 22, 26. The seal 82 retains lubricant within the bearing cup 72 to lubricate the roller bearings and generally is engaged between the bearing cup 72 and trunnion lip 56. The seal 82 may be separate from the bearing cup 72 or roll formed into the bearing cup to be integral with the bearing cup. The bearing cup includes a tubular portion 74 having a lower edge 76 and an end portion 78. When assembled on the trunnion and disposed in the aperture 40, the tubular portion 74 engages the inboard radial wall 36 (FIG. 2) of the aperture.

The service kit 88 (FIG. 8) is provided to service the staked U-joint 10 and includes a cutting tool 110 for cutting the stakes 44, and a removal tool 120. The service kit 88 may also include a retention assembly 90 and a replacement spider assembly 150. The replacement spider assembly 150 includes a replacement cruciform 152 and replacement bearing assemblies 170. The retention assembly 90 includes retention members 92 and spacers 94. A press tool 122, such as a modified C-clamp (FIG. 4) having a yoke press attachment 124 may also be supplied with the service kit 88 to assist in removal and insertion of the bearing cups from the apertures 40.

After the stakes 44 are cut with the cutting tool 110, as shown in FIG. 3B with the cut stakes 45, the original bearing assemblies 70 are removed from the apertures 40 by any known method. The original spider assembly 50 is then replaced with the replacement spider assembly 150, specifically, a replacement cruciform 152 and replacement bearing assemblies 170 (FIG. 8). The spacers 94 are inserted above the replacement bearing assemblies 170 and the retention member 92 is coupled to the annular groove 48 (FIG. 9). If needed, various sized retention members 92 and/or various sized spacers 94 may be selected to secure the replacement spider assembly 150 in approximately a balanced position, before coupling the retention member to the annular groove 48. The balanced position is generally where the center of the cruciform 52 is coincident with the axes 21, 25 of the shafts 20, 24 and other components of the driveshaft. The driveshaft is in an approximately balanced position if any deviation from the axes 21, 25 does not prevent proper operation of the driveshaft. In the preferred embodiment, the center of the cruciform 52 is within less than thirty-five thousands of an inch and typically is within less than twenty thousands of an inch of the axes 21, 25.

The serviced universal joint 12 (FIGS. 9 and 13) will now be described in greater detail. In general, during servicing of the U-joint, the stakes 44 are cut from the aperture 40 and the spider assembly 50 is replaced by the replacement spider assembly 150. The serviced U-joint 12 uses the retention members 92 coupled in the annular grooves 48 of the aperture 40 to maintain the replacement spider assembly 150 and, thereby the shafts 20, 24, in approximately a balanced position.

As illustrated in FIG. 13, in the serviced U-joint 12, the stakes 44 have been removed to be approximately flush with the inboard radial wall 36. In some embodiments, minute projections may remain from the stakes 44 due to the difficulty in completely removing the stakes 44 flush to the inboard radial wall 36. The inboard radial wall 36 and the annular seat 42 may still define the stake grooves 46 formed during the original staking process.

The replacement spider assembly 150 is typically manufactured to the same specifications as the original spider assembly 50, although changes may be made, such as to better accommodate the retention member 92 in place of stakes 44. Using the same specifications for the replacement spider assembly keeps costs low by standardizing the parts.

The replacement spider assembly 150 may include a replacement cruciform 152 and replacement bearing assemblies 170.

The retention assembly 90 is added to the serviced U-joint 12. The retention assembly 90 includes at least four retention members 92 and four spacers 94, one spacer and retention member for each trunnion (FIG. 8). The retention assembly 90 may further include retention members 92 with various thicknesses to facilitate securing and proper balancing of the replacement spider assembly 150 and thereby the shafts 20 and 24. In the illustrated embodiment, the retention assembly 90 includes three sets of retention members 92 having different thicknesses, with each set having four retention members of the same thickness. The retention members 92 may be traditional snap rings made in any size and shape to fit within the annular groove 48 on the aperture 40.

The spacer 94 generally includes a first side 96 and a second side 98. The first side 96 includes a rim 100 that extends laterally beyond the second side 98 (FIG. 10). The second side 98 has a diameter configured to fit within the inboard radial wall 36 on the aperture 40, while the first side has a diameter greater than the inboard radial wall and is configured to fit within the outboard radial wall 38. The rim 100 extends laterally beyond the inboard radial wall 36 and engages the annular seat 42 when the replacement spider assembly 150 is in approximately a balanced position. As with the retention members 92, the spacer 94 may come in various sizes and thicknesses. The outwardly extending rim 100 also ensures an even and secure surface for the retention member 92 to engage, to prevent variations in balancing and movement of the spacer. The second side 98 fits within the inboard radial wall 36 and engages and locates the replacement bearing assembly 170. The second side of the spacer 94 may fit within a recess on the end portion 178 of the replacement bearing cup 172.

Figure 3A:
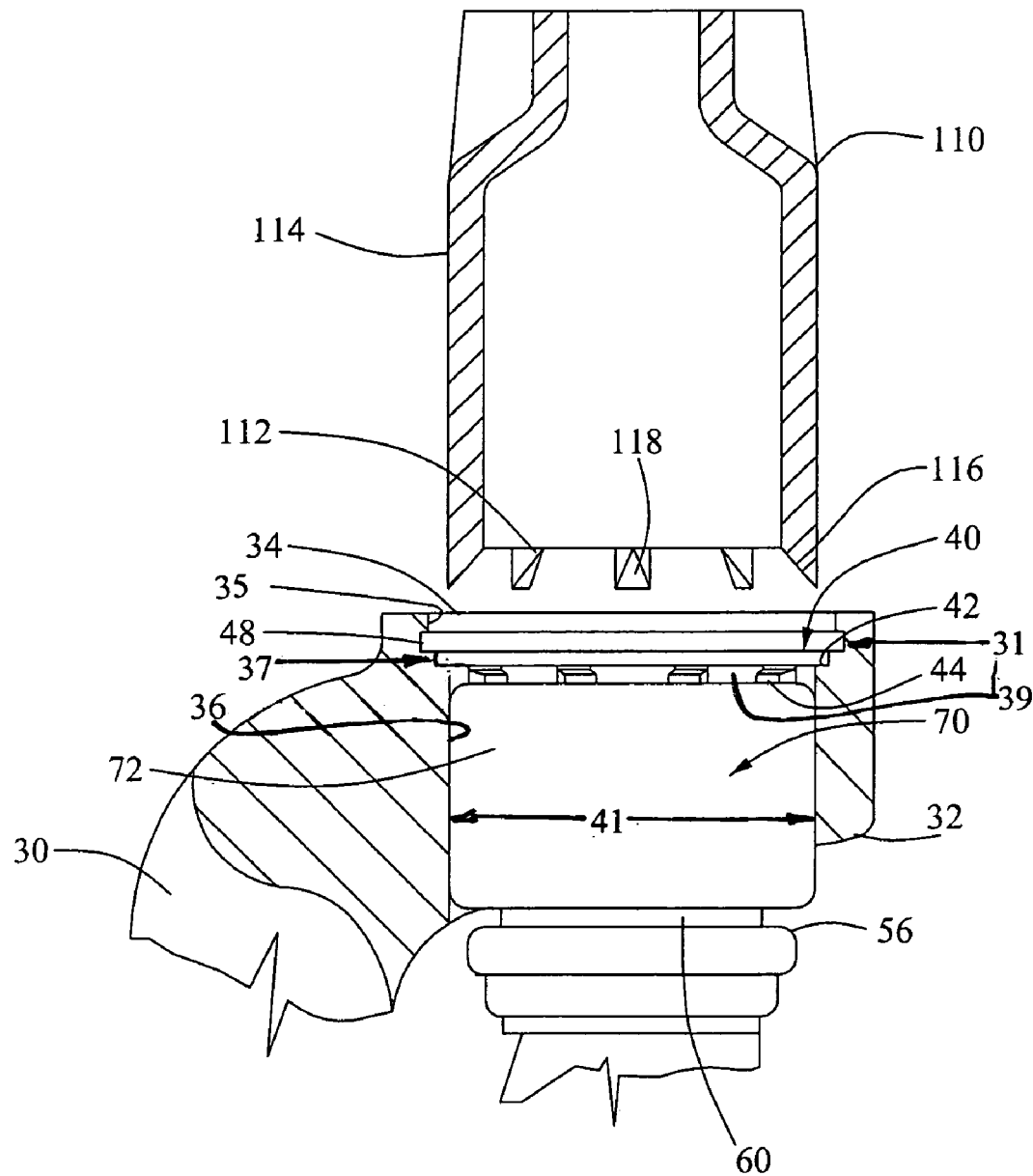
FIG. 3A is an enlarged partial sectional view of FIG. 2.

The cutting tool 110 of the service kit 88 is sized to fit within the aperture 40 and capable of cutting the stakes 44 from the aperture 40. The cutting tool 110 may take a number of similar forms including hole saws, flat coring bits, and other cutting devices. In the embodiment illustrated in FIG. 3A, the cutting tool 110 includes an outer tool surface 114 having a diameter slightly smaller than that of the inboard radial wall 36. Teeth 112 extend from the body of the cutting tool and have an outer tooth surface 116 generally parallel to and aligned with the outer tool surface 114. The outer tool surface 114 also forms the outer tooth surface 116. An inner tooth surface 118 is angled relative to the outer tooth surface 116. The angle between the inner and outer tooth surfaces 116, 118 is configured to match the approximate angle of the rounded over edge 73 of the replacement bearing cup 172 where the tubular portion 174 meets the end portion 178 relative to the inboard radial wall 36 as illustrated in FIG. 3A. The angled teeth 112 facilitates complete removal of the stakes 44 from the inboard radial wall 36, even if the stakes 44 extend slightly beyond the end portion 78 of the bearing cup 72 toward the inboard surface 32 of the bifurcated leg 30, where many cutting tools are not able to reach. Further, in the illustrated embodiment, the cutting tool 110 is configured so that the teeth 112 fit between the stakes 44 (FIG. 2). By fitting the teeth 112 between the stakes 44, the cutting tool 110 may be hand powered such as by a half-inch socket wrench. In the illustrated embodiment, the cutting tool 110 includes eight teeth. The tool may be included as a disposable tool in the service kit 88 or provided separately. The service kit 88 may also be provided in parts, such as the cutting tool 110 and removal tool 120 provided separately from the replacement spider assembly 150.

A variety of removal tools 120 are known in the art. In general, the tool 120 is configured to assist in the removal of bearing cups from snap ring U-joints. The illustrated removal tool 120 has a half moon shape similar to the outer radial surface 64 of the trunnion 60.

A method of servicing the staked U-joint 10 will now be described in greater detail below. The method generally includes the steps of cutting the stakes 44, removing the spider assembly 50, and securing the replacement spider assembly 150.

To service the vehicle, the driveshaft is first removed. The method of removal from the vehicle may depend on the vehicle and type of driveshaft. Generally, it is helpful to index mark the driveshaft to provide position reference marks for use during assembly. For example, the driveshaft flange and rear axle pinion flange (not shown) may be marked as reference points. The actual order of removal of components may depend on the driveshaft and vehicle.

With the driveshaft removed from the vehicle, the driveshaft is secured from movement taking care to prevent denting or fracturing which may result in an unbalanced driveshaft or driveshaft failure. With the driveshaft secured, the cutting tool 110 is inserted into the aperture 40 that the teeth 112 fit between the stakes 44. The cutting tool is then rotated to cut the stakes 44 from the inboard radial wall 36 (FIG. 3B). A downward force should be applied to the cutting tool 110 while rotating. The above procedure for removing the stakes 44 is then repeated for each of the remaining apertures 40. Because the bearing cups 72 are generally pressed into the apertures 40 in addition to being staked in place, the bearing cups are generally pressed into the apertures 40 in addition to being staked in place, the bearing cups 72 commonly pressed out of each aperture 40.

Figure 4:
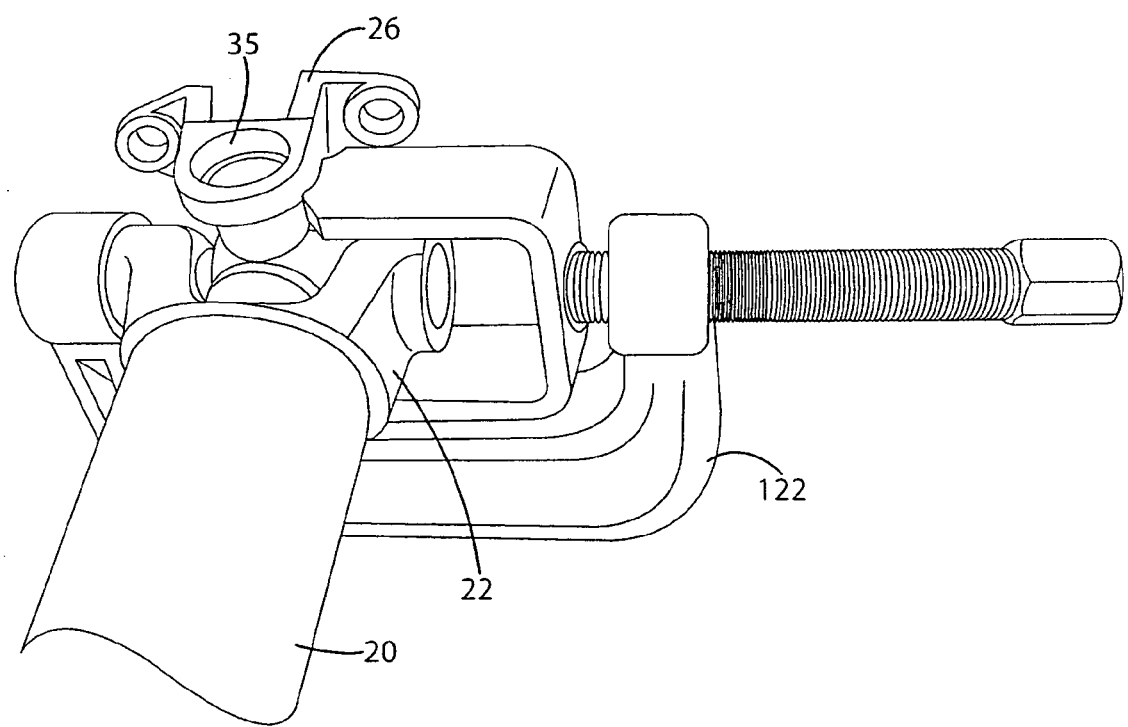
FIG. 4 is a perspective view of the press tool aligned to remove the bearing cups.
Figure 5:
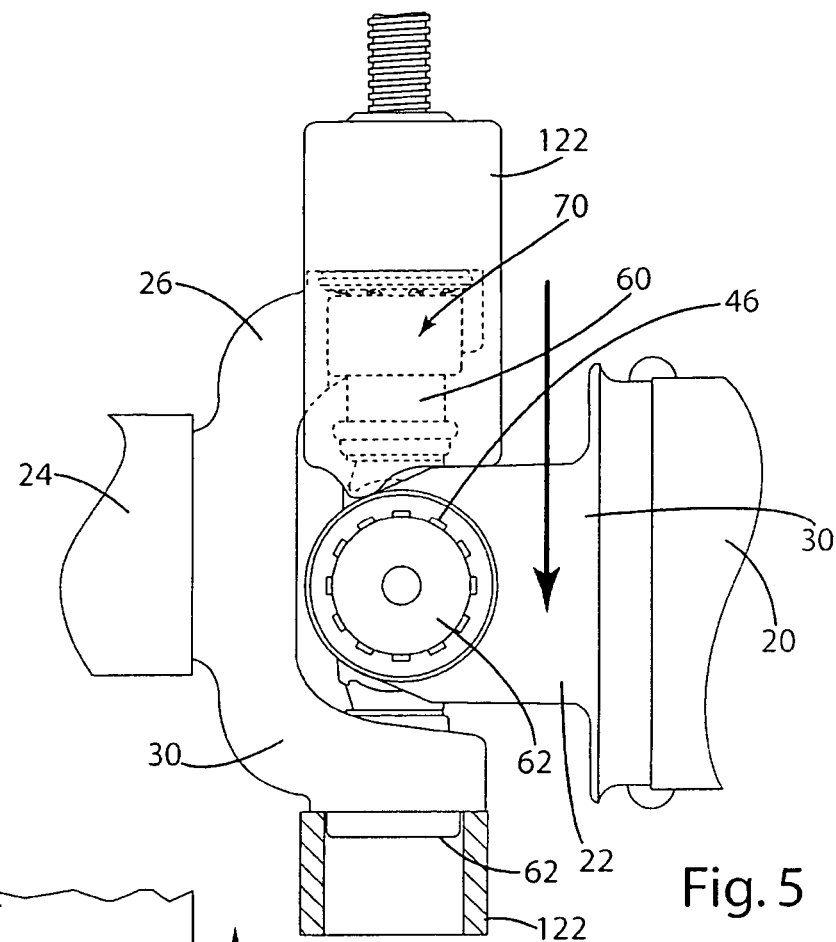
FIG. 5 is a partial sectional view showing the bearing cup partially removed.
Figure 6:
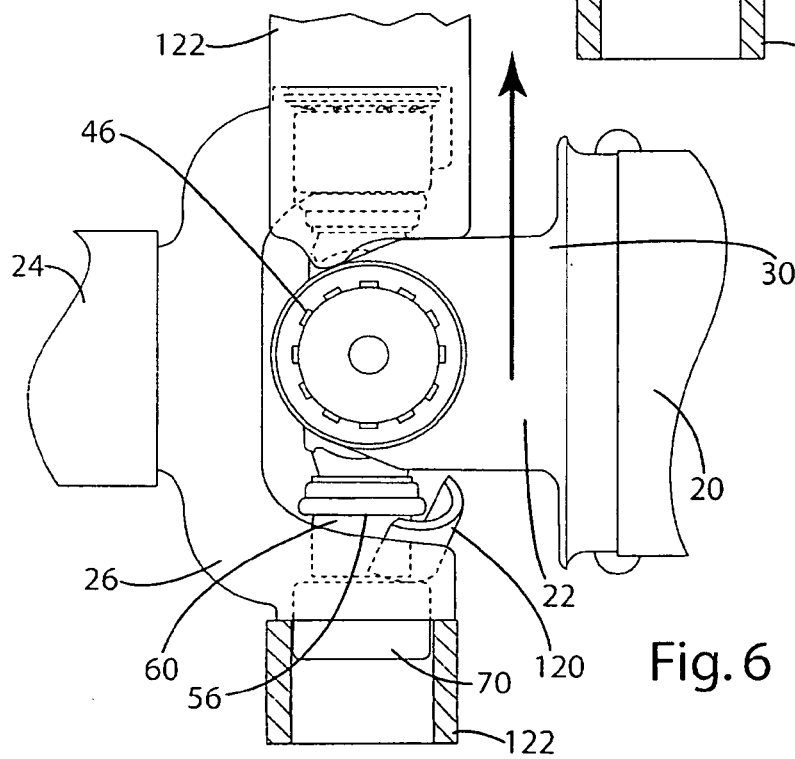
FIG. 6 is a partial sectional view of the removal tool being inserted.
Figure 7:
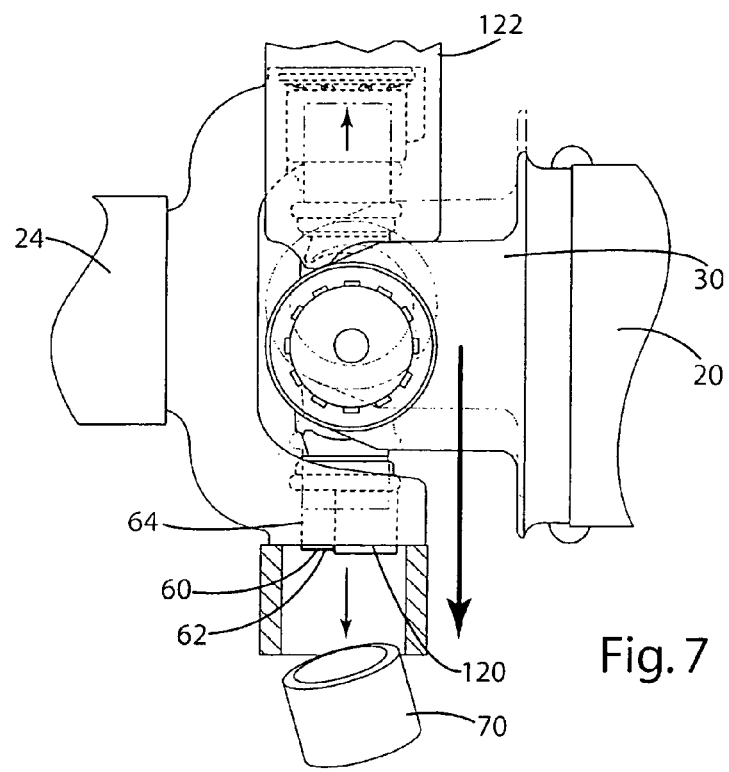
FIG. 7 is a perspective view showing the bearing cup removed.

To press out a bearing cup secured within an aperture 40 on one of the first or second shafts 20, 24, the yoke 22, 26 on the opposing shaft 20, 24 is pressed in the direction that forces the bearing cup outwardly from the aperture (FIG. 4). The illustrated press tool 122 with the yoke press attachment 124 is helpful in applying an equal force to each leg of the yokes 22, 26 (FIG. 5). In some embodiments, the force to press the bearing cup 72 out of the aperture 40 may be applied to the trunnions 60 arranged in a perpendicular position to the bearing cup being pressed out. Typically, the yokes 22, 26 cannot move far enough to press the bearing cup 72 completely out of the aperture. Therefore, the force is removed from the yoke 22, 26 or spider assembly 50 and the yoke is returned to its original position. With the yoke 22, 26 in its original position, the removal tool 120 is inserted between the lower edge of the bearing cup 72 and the trunnion lip 56 (FIG. 6). With the removal tool 120 being secured in position against the trunnion 60, force is again applied in the same direction as previously applied by the press tool 122 so that the trunnion lip applies a force to the removal tool which in turn applies a force to the bearing cup 72. With the removal tool 120 in place, the bearing cup 72 may be completely pressed out of the apertures 40 as illustrated in FIG. 7. The above described method for removing the bearing cups 72 from the apertures 40 prevents damage to the yoke shafts from hammering out the bearing cups as used in some prior art methods. The method is then repeated for the remaining bearing cups 72 until each bearing cup is removed from its respective aperture 40 so that the cruciform 52 may be removed.

A replacement spider assembly 150 is then assembled to interconnect the yokes 22, 26 with the replacement bearing cups 172 being placed in their respective apertures 40. To press in the replacement bearing cups 172, the press tool 122, such as the illustrated C-clamp without the yoke press attachment 124, may be used. In the illustrated embodiment, with the bearing cups 172 pressed in approximately the correct position, the spacer 94 is placed in each of the apertures with the second side engaging the bearing cup end portion 78. The replacement bearing cups 172 and spacers are then pressed in until the rim 100 engages the annular seat 42. The retention member 92 is then secured within the annular groove 48 to hold the spacer 94 and bearing cup 172 in position (FIG. 13). Before the retention member 92 is coupled to the annular groove 48, the retention member may be selected for its thickness. For example, the retention assembly 90 may include retention members 92 with various thicknesses. The method is then repeated to secure the remaining bearing cups and remaining spacers in the apertures 40. The driveshaft may then be reassembled and installed in the vehicle.

The staked universal joint 10 with the stakes 44 located between the annular groove 48 and a secured bearing cup 72 allows the staked U-joint to secure the original bearing cup 72 with stakes 44 before servicing and the replacement bearing cup 172 with the retention members 92 coupled in the annular groove 48 after servicing. The addition of the annular groove 48 to the staked U-joint 10, for the retention member 92, ensures that the U-joint may be later serviced without the use of expensive balancing, centering, and yoke deformation equipment. The annular groove 48 may be configured to receive any known retention member commonly used with traditional non-staked U-joints. The annular seat 42 is also used during servicing as a reference point for centering the replacement spider assembly 150.

In an alternative embodiment, the inner surface 35 may be formed without the annular seat 42, and having a single radial wall wherein the stakes 44 are formed from the radial wall and the annular groove 48 is formed in the radial wall between the stakes and the outboard surface 34. In this alternative embodiment, the first and second sides 96, 98 may both fit within the inner radial wall 36, with the second side being configured to fit within a recess in the replacement bearing cup 172 (not shown). It should be readily recognized that any wall configuration with an annular groove to receive a retention member and a spacer between the retention member and bearing cup may be used.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A universal joint comprising:
    a yoke including a leg having an inboard surface and an outboard surface with an aperture extending between said inboard and outboard surfaces, said aperture including an inner surface formed with an annular groove having a first diameter and a second diameter located inboard of the first diameter, the inner surface further including an inboard radial wall having a third diameter that is smaller than the second diameter, and a seat on which a plurality of stakes had been formed and from which said stakes have been removed;
    a bearing cup positioned in the third diameter of said aperture;
    a retention member disposed within said annular groove; and
    a spacer disposed between said bearing cup and said retention member, the spacer being located axially inboard from the annular groove, adjacent the bearing cup, said spacer including a laterally extending rim contacting said seat.

2. The universal joint of claim 1 wherein said seat provides an annular seat between said second diameter and the third diameter.

3. The universal joint of claim 2 wherein said spacer includes:
    a first side located in the second diameter;
    a second side located in the third diameter and facing the bearing cup; and
    the annular rim is located between the first side and the second side and contacts said seat.

4. The universal joint of claim 1 wherein said retention member and said spacer have a combined thickness such that said bearing cup is located in approximately a balanced position within said aperture.

5. The universal joint of claim 1 wherein said aperture includes an outboard radial wall located outboard of the annular groove, and the seat supports the spacer thereon.

6. The universal joint of claim 5 wherein said spacer engages said seat.

* * * * *